United States Patent [19]

Biranowski et al.

[11] 4,175,155

[45] Nov. 20, 1979

[54] DECORATIVE COVERING MATERIAL

[75] Inventors: Jerome Biranowski, Bronx, N.Y.; Kenneth J. Faust, Cressona, Pa.

[73] Assignee: GAF Corporation, New York, N.Y.

[21] Appl. No.: 863,432

[22] Filed: Dec. 22, 1977

[51] Int. Cl.² .......................... B32B 3/26; B32B 5/20; B05D 5/00; B05D 3/02
[52] U.S. Cl. ................................... 428/313; 427/244; 427/373; 428/317; 428/337
[58] Field of Search ............... 428/268, 290, 304, 308, 428/310, 313, 314, 315, 317, 318, 337; 427/244, 373

[56] References Cited

U.S. PATENT DOCUMENTS

| | | | |
|---|---|---|---|
| 2,879,197 | 3/1959 | Muskat et al. | 428/305 |
| 3,050,427 | 8/1962 | Slayter et al. | 428/245 |
| 3,483,069 | 12/1969 | Cairns et al. | 428/310 |
| 3,867,494 | 2/1975 | Rood et al. | 428/310 |
| 3,962,512 | 6/1976 | Fontana et al. | 428/317 |
| 4,028,158 | 6/1977 | Hipchen et al. | 428/313 |

*Primary Examiner*—William J. Van Balen
*Attorney, Agent, or Firm*—Walter C. Kehm; Joshua J. Ward

[57] ABSTRACT

Decorative sheet-type covering material and method for making same. The material has a substrate comprising a porous mat saturated and completely coated on both sides with foamed, flexible urethane. The substrate is made by coating one side of a porous mat with reactive urethane mixture which is then allowed to foam.

4 Claims, No Drawings

DECORATIVE COVERING MATERIAL

BACKGROUND OF THE INVENTION

Decorative, flexible, sheet-type covering materials such as wall or floor coverings are conventionally manufactured with non-woven organic or glass fiber mats or woven cloth as a substrate. Where glass fiber mats are used, it is desirable to insure that both faces of the glass mat are covered with a protective coating to protect those handling the covering material from the skin irritation associated with handling glass fiber material. Availability of a suitable surface for printing is also desirable. Satisfactory substrates using glass mats are especially desirable as a replacement for the more commonly used asbestos felt substrates in view of the currently recognized hazards to health involved in the use of asbestos.

While glass mats coated with protective material are known, the use of such mats coated on both sides or faces with protective material has in the past involved the use of release paper or lamination of coatings. In other applications, glass mats has been coated on one side with cured polyvinyl chloride (PVC) plastisol or organosol as illustrated for instance in U.S. Pat. No. 3,490,985 to Marzocchi et al.

SUMMARY OF THE INVENTION

It is an object of the invention to provide improved, decorative, flexible sheet-type covering material which has a substrate comprising a porous mat saturated and completely coated on both faces with foamed, heat cured flexible urethane. A further object of the invention comprising coating one side only of the porous mat with heat curable, foamable, flexible urethane mixture, causing said mixture to completely penetrate said mat, foaming said mixture so as to saturate said mat and completely coat said mat on both sides with the thus foamed flexible urethane polymer and then curing the thus foamed urethane polymer to provide sheet-type covering material of the invention.

DETAILED DESCRIPTION OF THE INVENTION

As mentioned above, the decorative, flexible, sheet-type covering material of the invention has a substrate comprising a porous mat saturated and completely coated on both faces with heat cured, foamed, flexible urethane polymer. While the invention is applicable to porous mats made from any flexible material, the preferred material is glass fibers in woven or non-woven form with non-woven glass fiber mats being especially preferred. Mats for use in the invention should have openings of a suitable size so that the urethane reaction mixture can penetrate the mat as described below to insure saturation of the mat and thorough coating of the mat on both sides with foamed urethane. Complete coverage of both sides of the mat is essential to protect those handling the finished covering material from exposure to the glass fibers making up the mat. When using the preferred urethane polymers described below, non-woven glass fiber mats suitable for use in the invention generally have openings averaging between about 1 and about 20 mils in the smallest linear dimension with at least about 50% of such openings having smallest linear dimensions between about 2 and about 10 mils. Preferred mats include those having a thickness between about 10 and about 40 mils and a density between about 1 and about 4 pounds per 100 square foot. Such mats may be manufactured by conventional techniques used for manufacturing non-woven glass mats with the glass fibers used preferably having an average diameter between about 5 and about 20 microns, more preferably between 7 and 15 microns, and fiber lengths between about 0.2 and about 1.5 inches. Binders conventionally used for coating glass fibers may be used and where used are normally present in amounts between about 1 and about 50 wt% of the mat. Suitable binders for coating glass fibers of the mats used in the invention include, for instance, urea-formaldehyde, latexes, thermosetting resins such as polyester resins, epoxy resins and the like and may include, among other conventional binders, those mentioned in U.S. Pat. 3,554,851 to Modigliani, the disclosure of which is incorporated herein by reference. The binder may, of course, be applied to the glass fibers in a conventional manner.

Where heating to cause penetration of the mat is used as a separate manufacturing step, the urethane foam coated mat is preferably heated to a temperature less than about 200° F. Curing temperatures between about 200° F. and 400° F. are preferred to allow cure time between about 0.5 and about 3 minutes.

Decorative, flexible, sheet-type covering material contemplated by the invention includes conventional wall and floor coverings and especially material such as sheet vinyl, linoleum and the like. Such sheet vinyl flooring frequently has one or more foamed or unfoamed vinyl layers of the PVC type generally used in vinyl flooring over the substrate.

The vinyl layer may comprise any of the PVC resin materials normally used in connection with the manufacture of sheet vinyl flooring and may specifically include but is not limited to those described in U.S. Pat. No. 3,458,337, the disclosure of which is incorporated herein by reference. The vinyl layer in such flooring materials is typically on the order of between about 5 and about 25 mils thick and may be opaque, translucent or transparent as desired. Other layers of sealer, pigmented layers, plastisols, wear layers, etc. known in the art may, of course, be used. Where transparent or translucent vinyl layers are used, it is frequently desirable to apply a printed design to the coated substrate formed in accordance with the invention. Since the foamed coating on the substrate may not always be sufficiently smooth for direct printing of some designs, a conventional sealing or priming coat of latex or of plastisol or organosol as described for instance in U.S. Pat. No. 3,519,460 may be used. Conventional latex containing an acrylic polymer such as the prime coat described in the above-mentioned U.S. Pat. No. 3,458,337 is, for instance, suitable for this purpose.

Heat curable, flexible, foamable urethane mixtures suitable for use in the invention include a wide variety of urethane materials. By the term "heat curable, foamable flexible urethane mixture" is meant a mixture which, when foamed and cured in the form of an unreinforced ¼ inch urethane foam sheet, can be bent 180° F. around a one inch mandrel without permanent set. In general suitable urethanes include the reaction product of an organic compound having at least two active hydrogen atoms, such as, a hydroxy-terminated polyester, polyesteramine, amide or polyether, and an organic polyisocyanate.

In general, any organic compound containing at least two active hydrogen atoms may be employed herein for reaction with the polyisocyanate to produce a flexible polyurethane foam. Examples of suitable types of organic compounds containing at least two active hydrogen groups are castor oil, hydroxy-containing polyesters, polyalkylene polyether polyols, hydroxy-terminated polyurethane polymers, polyhydric polythioethers, alkylene oxide adducts of acids of phosphorus, aliphatic polyols, as well as mixtures thereof.

Any suitable hydroxyl-containing polyester may be used such as are obtained, for example, for polycarboxylic acids and polyhydric alcohols. Any suitable polycarboxylic acid may be used, such as oxalic acid, malonic acid, succinic acid, glutaric acid, adipic acid, pimelic acid, suberic acid, azelaic acid, sebacic acid, maleic acid, fumaric acid, glutaconic acid, -butyl- -ethyl-glutaric acid, - -diethylsuccinic acid, isophthalic acid, terephthalic acid, hemimellitic acid, and 1,4-cyclohexanedicarboxylic acid. Any suitable polyhydric alcohol including both aliphatic and aromatic may be used, such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol. Also included within the term "polyhydric alcohol" are compounds derived from phenol, such as 2,2-(4,4-hydroxyphenyl) propane, commonly known as Bisphenol A.

Any suitable polyalkylene polyether polyol may be used, such as polymerization product of an alkylene oxide or of a mixture of alkylene oxides with a polyhydric alcohol. Any suitable alcohol may be used, such as those disclosed above for use in the preparation of the hydroxyl-containing polyesters. Any suitable alkylene oxide may be used, such as ethylene oxide, propylene oxide, butylene oxide, amylene oxide, and heteric or block copolymers of these oxides. The polyalkylene polyether polyols may be prepared from other starting materials, such as tetrahydrofuran and alkylene oxide-tetrahydrofuran copolymers; epihalohydrins, such as epicholorohydrin; as well as aralkylene oxides, such as styrene oxide. The polyalkylene polyether polyols may have either primary or secondary hydroxyl groups and, preferably, are polyethers prepared from alkylene oxides having from 2 to 6 carbon atoms, such as polyethylene ether glycols, polypropylene ether glycols and polybutylene ether glycols. The polyalkylene polyether polyols may be prepared by any known process, such as, for example, the process disclosed by Wurtz in 1859 in Encyclopedia of Chemical Technology, vol. 7, pp. 257–262, published by Interscience Publishers, Inc. (1951) or in U.S. Pat. No. 1,922,459.

Typical polyether polyols include polyoxyethylene glycols, poly-1,2-oxybutylene and polyoxyethylene glycols polytetramethylene glycol, block copolymers, e.g., combinations of polyoxypropylene and polyoxyethylene glycols, poly-1,2-oxybutylene and polyoxyethylene glycols and poly-1,4-oxybutylene and polyoxyethylene glycols, and random copolymer glycols prepared from blends or sequential addition of two or more alkylene oxides. Also, adducts of the above with trimethylolpropane, glycerine and hexanetriol may be employed. The polyether polyols generally have an average equivalent weight from about 150 to 5000 and preferably have an average equivalent weight from about 200 to 2000. Polyoxypropylene glycols having molecular weights from about 400 to 2500 corresponding to equivalent weights from about 200 to 1250 and mixtures thereof are particularly useful as polyol reactants. Also, polyol blends such as a mixture of high molecular weight polyether polyols with lower molecular weight polyether polyols or monomeric polyols can be used in preparing the polyurethane.

Any suitable polyhydric polythioether may be used, such as, for example, the condensation product of thiodiglycol or the reaction product of a dihydric alcohol, such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol, such as ethanol-amine, with the polycarboxylic acids set forth above or they may be made using the same components that make up the hydroxyl-containing polyester with only a portion of the components being a diamine, such as ethylene diamine.

Alkylene oxide adducts of acids of phosphorus which may be used include those neutral adducts prepared from the alkylene oxides disclosed above for use in the preparation of polyalkylene polyether polyols.

The organic polyisocyanates which are advantageously employed in the present invention can be represented by the formula:

R(NCO)$_z$ wherein R is a polyvalent organic radical selected from the group of aliphatic, aromatic, arylalkyl and alkylaryl organic radicals as well as mixtures thereof; and z is an integer corresponding to the valence number of R and is at least 2. Representative of the organic polyisocyanates contemplated herein includes, for example, the aromatic diisocyanates, such as 2,4-toluene diisocyanate, 2,6-toluene diisocyanate, mixture of 2,4-and 2,6-toluene diisocyanate, crude toluene diisocyanate, methylene diphenyl diisocyanate, crude methylene diphenyl diisocyanate and the like. Other organic polyisocyanates include polymethylene polyphenylisocyanate, hydrogenated methylene diphenylisocyanate, m-phenylene diisocyanate, naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-diphenylmethane-4,4'-diisocyanate.

These polyisocyanates are prepared by conventional methods known in the art such as the phosgenation of the corresponding organic amine.

Still another class of organic polyisocyanates contemplated by the present invention are the so-called "quasi-prepolymers." These quasi-prepolymers are prepared by reacting an excess of organic polyisocyanate or mixtures thereof with a minor amount of an active hydrogen containing compound as determined by the well-known Zerewitinoff test, as described by Kohler in J. Am. Chem. Soc., 49,3181 (1927). These compounds and their method of preparation are well known in the art. The use of any one specific active hydrogen compound is not critical hereto, rather, any such compound that can be used to prepare a quasi-prepolymer can be employed herein. Generally speaking, the quasi-prepolymers are prepared by reacting an organic polyisocyanate with less than a stoichiometric amount, based on the weight of the polyisocyanate of the active hydrogen-containing compound. Suitable active hydrogen-containing groups are those hereinbefore described.

In the practice of the present invention, it is preferred to use as the isocyanate either crude toluene diisocyanate, an 80:20 weight mixture of 2,4- and 2,6-toluene diisocyanate, polymethylene polyphenyl polyisocyanate, crude methylene di(phenylisocyanate) or mixtures thereof, or the quasi-prepolymer described above.

In accordance with the present invention, a polyisocyanate is employed at an isocyanate index of from about 105 to 115. As used herein, the term isocyanate index means the actual amount of isocyanate used divided by the theoretically required stoichiometric amount of isocyanate multiplied by one hundred. See Bender, Handbook of Foamed Plastics, Lake Publishing Corp., Libertyville, Ill. (1965). Conventional catalysts, such as tertiary amines and the like, may be incorporated into the foam formulation in order to provide the products envisioned hereby. This same fact is true with regard to conventional diamine cross-linking agents.

Suitable catalysts include tertiary amines, such as diethylene triamine ketimine, tetramethylene, diamine, triethylene diamine, tetramethylbutane diamine, tetramethyl guanidine, trimethyl piperazine and metalloorganic salt catalysts which are polyvalent metal salts of an organic acid having up to about eighteen carbon atoms and being void of active hydrogen atoms. The organo portion of the salt may be either linear or cyclic and saturated or unsaturated. Generally, the polyvalent metal has a valence from about two to four. Typical metalloorganic salts include stannous acetate, stannous butyrate, stannous 2-ethylhexoate, stannous laurate, stannous oleate, stannous stearate, lead cyclopentane carboxylate, cadmium cyclohexane carboxylate, lead naphthenate, lead octoate, cobalt naphthenate, zinc naphthenate, bis(phenyl mercury) dodecyl succinate, phenyl mercuric benzoate, cadmium naphthenate, dibutyltin dilaurate, and dibutyltin dilaurate, and dibutyltin-di-2-ethylhexoate. Generally, these catalysts, when used, will be employed in an amount ranging from about 0.01 part to 7.5 parts by weight, based on the weight of polyether polyol, and preferably, from about 0.05 part to 4.0 parts by weight thereof per 100 parts by weight of polyether polyol.

Suitable optional cross-linking agents include, for example, hindered, aromatic diamines like 4,4'-methylene-bis(2-chloroaniline) and 3,3'-dichlorobenzidine; tetiary amines containing hydroxyl groups and capable of cross-linking such as triethanolamine, triisopropanolamine, N,N,N',N'-tetrakis(2-hydroxypropyl)ethylenediamine as well as other condensation products of alkylene oxides and ethylenediamine or diethylenetriamine and low molecular weight polyols such as glycerol, trimethylolpropane and butanediol.

In addition to the previously defined ingredients useful in the preparation of the foam, other ingredients, such as surfactants, fillers, pigments and the like can also be included. Surfactants which can be used are the conventional surfactants used in urethane preparation such as the polysiloxanes or the alkylene oxide adducts of organic compounds containing reactive hydrogen atoms.

Generally, the surfactant is employed in an amount ranging from about 0.1 part to 5 parts by weight thereof per hundred parts of polyol. Conventional fillers for use herein include, for example, aluminum silicate, calcium silicate, magnesium silicate, calcium carbonate, barium sulfate, calcium sulfate, carbon black and silica. The filler is nominally present in an amount ranging from about 5 parts to 50 parts by weight thereof per hundred parts by weight of polyol, and preferably, from about 15 parts to 45 parts by weight thereof per one hundred parts by weight of polyol.

The pigment which can be used herein can be selected from any conventional pigment heretofore disclosed in the art, titanium dioxide, zinc oxide, iron oxides, antimony oxide, chrome green, chrome yellow, iron blue, siennas, molybdate oranges, organic pigments such as para reds, benzidine yellow, toluidine red, toners, and phthalocyanines.

Also, conventional blowing agents, such as water, halohydrocarbons, hydrocarbons, and the like can be employed herein in their conventional mode.

Urethane foam mixtures used in making foams suitable for the invention should have cream times (time from formation of the mixture to beginning of foaming) sufficient to allow penetration of at least about one-half the thickness of the mat before foaming begins. Where mixtures are formed at waiting temperatures and immediately coated onto the mat, cream times of at least about three seconds preferred. Creaming will of course occur when the urethane is heated to curing temperature if creaming has not previously occurred.

While a wide variety of flexible urethanes may be suitable for use in the product and process of the invention, selection of a particular urethane formulation or mixture thereof suitable for a given application preferably takes into account such factors as the nature of the porous mat to be saturated and coated, the viscosity of the reaction mixture, etc. Generally the most important factors are the nature of the mat, especially the size of the openings in the mat, reaction time (cream and gel time) of the urethane, and the viscosity of the urethane mixture before reaction begins. For ease of application to the mat and to insure complete saturation and coating of both sides of the mat by the foamed urethane, it is preferred that the urethane be of a suitable viscosity so that it can be coated onto one surface only of the porous mat and allowed to penetrate the mat either at the coating temperature or by increase in temperature after the coating step. If urethane of too great a viscosity is used, complete penetration, saturation and coating of both sides of the mat will not take place and the finished substrate may well of the type desired in the above-mentioned U.S. Pat. No. 3,490,985 rather than the type which is the subject of the present invention. If urethane mixture of too low a viscosity is used, the material will tend to pass through the porous mat too readily prior to foaming thereof and proper saturation and coating may not be obtained.

While suitable viscosities for urethane used in the present invention may vary widely depending upon the type of mat and coating the foaming conditions used, preferred viscosities when using preferred glass fiber mats of the type described above include urethane reaction mixtures having viscosities between about 300 and about 10,000 centipoises (cp) at coating temperatures as measured on a Brookfield RVF viscometer with a number 3 spindle at 20 RPM. While coating is frequently carried out at room temperature, this is by no means essential and coating temperatures between about 50° and about 150° F. are suitable with many of the commonly used urethanes. In a preferred embodiment of the invention, coating is carried out at between about 50° and about 120° F. using a urethane which penetrates the mat to a depth of between about one-half and about three fourths the thickness of the mat at coating temperature. The coating may then be heated to cause it to completely penetrate the mat. Heating to cause penetration of the mat may be a separate manufacturing step or may be part of the heating process used to form and cure the urethane. Where heating to cause penetration of the mat is used as a separate manufacturing step, the urethane foam coated mat is preferably heated to a temperature less than about 200° F. Curing temperatures between about 200° and about 400° F. are preferred to allow cure times between about 0.5 and about 3 minutes.

Application of urethane reaction mixture to porous mats in accordance with the invention may be by any suitable means such as knife coating or roll coating. Using the preferred glass fiber mats and urethanes described above, urethane coatings between about 10 and about 20 mils thick are generally satisfactory to provide complete saturation and coverage of both faces of the mat when the urethane is foamed.

The following examples illustrate preferred embodiments of the invention but are not intended to limit the scope of the invention.

EXAMPLE I

To demonstrate the utility of the invention, a metered coating approximately 12 mils thick of flexible, foamable urethane mixtures may be drawn onto a non-woven fiberglass mat using a conventional knife coater. The mat may be made up of glass fibers having an average diameter of about 9 microns and an average length of about 0.75 inch. The fibers may be coated with urea-formaldehyde binder with the binder making up about 15 weight percent of the mat. The mat may have a total density of 1.4 lbs per 100 square feet with openings in the mat having smallest linear dimensions averaging about 5 mils. The mat may be 15 mils thick. The urethane may be coated onto the mat from a continuous mixing and dispersing machine at a temperature of 75° F. The urethane mixture may have the following composition:

| Ingredient | Parts by Weight |
| --- | --- |
| STREAM 1 | |
| Urethane prepolymer, based on poly (tetramethylene glycol) and toluene diisocyanate, having 6.35% NCO | 100 |
| Methylene chloride blowing agent | 8 |
| Silicone copolymer surfactant | 2 |
| STREAM 2 | |
| Butanediol crosslinking agent | 6.5 |
| Triethylene diamine catalyst | 0.05 |

After coating of the mat as described above, the coated mat may then be heated to a temperature of 180° F. whereby the urethane mixture, which has an original viscosity at coating temperature of about 800 cps and has previously penetrated about one-half the thickness of the mat, is allowed to completely penetrate the mat. The urethane may then be foamed and cured at a temperature of 300° F. with a cure time of about 2 minutes. Upon foaming of the urethane, it will be found that the finished substrate is completely saturated and coated on both sides with the foamed flexible urethane.

EXAMPLE II

Utility of the invention may be further demonstrated by coating approximately a 12 mil thick layer of foamable urethane onto one face only of a non-woven fiberglass mat approximately 18 mils thick and weighing approximately 2.3 lbs per 100 square feet using a conventional three roll reverse roll coater. The urethane used may be the same as that described in Example I. The glass mat may be similar to that used in Example I except that the binder is a latex binder making up about 40 weight percent of the mat. Except as mentioned immediately above, Example II may be conducted in the same manner as Example I. As in Example I, the mixture will penetrate about one-half the thickness of the mat until subsequent heating and curing when the urethane will completely penetrate the mat and the foamed urethane will expand to completely saturate the mat and cover both faces thereof.

While the invention has been described with respect to preferred embodiments thereof, it will be understood by those skilled in the art that various changes and modifications may be made without departing from the spirit or scope of the invention.

What is claimed is:

1. Decorative, flexible, sheet type covering material having a substrate comprising a porous, non-woven mat of glass fibers saturated and completely coated on both sides with foamed, heat cured, flexible urethane, said mat being characterized by;
   a. the glass fibers having an average diameter between about 7 and about 15 microns and an average length between about 0.2 and about 1.5 inch;
   b. openings in such mat averaging between about 1 and about 20 mils in the smallest linear dimension with at least about 50 percent of such openings having smallest linear dimensions between about 2 and about 10 mils; and
   c. the mat being between about 10 and about 40 mils thick and having a density between about 1 and about 4 lbs per 100 square feet.

2. Method for making flexible coated substrate material comprising the steps of:
   (a) coating one side only of a porous non-woven mat of glass fibers with foamable flexible urethane mixture having a viscosity between about 300 and about 10,000 cp at the temperature at which it is coated onto the mat, said mat being characterized by;
      (i) the glass fibers having an average diameter between about 7 and about 15 microns and an average length between about 0.2 and about 1.5 inch;
      (ii) openings in such mat averaging between about 1 and about 20 mils in the smallest linear dimension with at least about 50 percent of such openings having smallest linear dimensions between about 2 and about 10 mils; and
      (iii) the mat being between about 10 and about 40 mils thick and having a density between about 1 and about 4 pounds per square foot;
   (b) causing said unfoamed urethane mixture to completely penetrate said mat by heating the mat to a temperature between about 200 and about 400° F.;
   (c) then foaming said urethane mixture so as to saturate and completely coat said mat on both faces thereof with the thus foamed urethane mixture; and
   (d) then heat curing the foamed urethane mixture.

3. A method according to claim 2 wherein the coating of urethane mixture is applied to one side of the mat at a temperature between about 50° and about 120° F. and penetrates between about one-half and about three-fourths the thickness of the mat at the temperature at which the coating is applied, and in which the mat is subsequently heated to a temperature between about 200° and about 400° F. sufficient to cause the mixture to completely penetrate the mat prior to the foaming of the mixture and to subsequently cause the mixture to foam.

4. A method according to claim 3 wherein the foamable urethane mixture is coated onto one side of the mat in a layer between about 10 and about 20 mils thick.

* * * * *